United States Patent
Connolly

(10) Patent No.: US 10,696,093 B2
(45) Date of Patent: *Jun. 30, 2020

(54) METHOD OF MANUFACTURING A LIGHTWEIGHT WHEEL WITH HIGH STRENGTH FLEXIBLE SPOKES

(71) Applicant: SPINERGY INC., Carlsbad, CA (US)

(72) Inventor: Martin Connolly, San Marcos, CA (US)

(73) Assignee: Spinergy Inc.

( * ) Notice: Subject to any disclaimer, the term of this patent is extended or adjusted under 35 U.S.C. 154(b) by 0 days.

This patent is subject to a terminal disclaimer.

(21) Appl. No.: 16/273,113

(22) Filed: Feb. 11, 2019

(65) Prior Publication Data

US 2019/0210404 A1 Jul. 11, 2019

Related U.S. Application Data

(63) Continuation of application No. 15/597,449, filed on May 17, 2017, now Pat. No. 10,201,999, which is a continuation of application No. 14/519,312, filed on Oct. 21, 2014, now Pat. No. 9,682,596, which is a continuation-in-part of application No. 13/492,573, filed on Jun. 8, 2012, now Pat. No. 8,985,708, which is a continuation-in-part of application No.
(Continued)

(51) Int. Cl.
*B60B 1/02* (2006.01)
*B60B 1/04* (2006.01)
*B60B 5/02* (2006.01)
*B60B 21/06* (2006.01)
*B60B 1/00* (2006.01)

(52) U.S. Cl.
CPC ............ *B60B 1/0261* (2013.01); *B60B 1/042* (2013.01); *B60B 1/043* (2013.01); *B60B 1/044* (2013.01); *B60B 5/02* (2013.01); *B60B 21/062* (2013.01); *B60B 21/064* (2013.01); *B60B 1/003* (2013.01); *B60B 2360/341* (2013.01); *B60B 2900/111* (2013.01); *B60B 2900/313* (2013.01)

(58) Field of Classification Search
CPC ....... B60B 1/003; B60B 1/0261; B60B 1/041; B60B 1/042; B60B 1/043; B60B 1/044; B60B 1/045; B60B 1/046; B60B 5/02; B60B 21/062; B60B 21/064
See application file for complete search history.

(56) References Cited

U.S. PATENT DOCUMENTS 4,729,605 A 3/1988 Imao et al.
5,110,190 A 5/1992 Johnson
(Continued)

FOREIGN PATENT DOCUMENTS

EP 1101631 11/2000
EP 1167078 1/2001

*Primary Examiner* — Kip T Kotter
(74) *Attorney, Agent, or Firm* — Gary L. Eastman, Esq.; Eastman McCartney Dallmann LLP

(57) ABSTRACT

A method of manufacturing a lightweight wheel with high strength flexible spokes of the present invention, includes providing a rim and hub, and a plurality of lightweight, flexible and resilient spokes between the rim and hub made of fibrous material that causes the spokes to be both lighter in weight and stronger than comparable steel spokes. The wheel includes a nipple within the rim that receives the high strength spoke and allows for flexibility in adapting the spoke to wheels having differing shapes and sizes.

10 Claims, 10 Drawing Sheets

Related U.S. Application Data

13/487,253, filed on Jun. 4, 2012, now Pat. No. 8,985,707.

(56) References Cited

U.S. PATENT DOCUMENTS

| | | | |
|---|---|---|---|
| 5,350,221 A | 9/1994 | Pierce et al. | |
| 5,779,323 A | 7/1998 | Burrows | |
| 5,915,796 A | 6/1999 | Beyer | |
| 6,036,281 A | 3/2000 | Campbell | |
| 6,189,978 B1 | 2/2001 | Lacombe et al. | |
| 6,216,344 B1 | 4/2001 | Mercat et al. | |
| 6,247,382 B1 | 6/2001 | Umeki et al. | |
| 6,378,953 B2 | 4/2002 | Mercat et al. | |
| 6,497,042 B1 | 12/2002 | Dietrich | |
| 6,520,595 B1 | 2/2003 | Schlanger | |
| 6,846,047 B2 | 1/2005 | Dietrich | |
| 6,886,892 B2 | 5/2005 | Chiang et al. | |
| 6,899,401 B2 | 5/2005 | Schlanger | |
| 7,077,480 B2 | 7/2006 | Hjerterb et al. | |
| 7,083,239 B2 | 8/2006 | Okajima | |
| 7,090,307 B2 | 8/2006 | Okajima | |
| 7,093,910 B2 | 8/2006 | Hjerterb et al. | |
| 7,140,696 B1 | 11/2006 | Guzik | |
| 7,192,097 B2 | 3/2007 | Schlanger | |
| 7,290,839 B2 | 11/2007 | Okajima | |
| 7,562,940 B2 | 7/2009 | D'Aluisio | |
| 7,562,942 B2 | 7/2009 | D'Aluisio | |
| 7,631,945 B2 | 12/2009 | Addink | |
| 7,631,947 B2 | 12/2009 | Mercat et al. | |
| 7,658,450 B2 | 2/2010 | Mercat et al. | |
| 7,784,878 B2 | 8/2010 | Schlanger | |
| 7,926,884 B2 | 4/2011 | Heyse | |
| 7,926,885 B2 | 4/2011 | Saillet et al. | |
| 7,950,747 B2 | 5/2011 | Mercat et al. | |
| 7,988,240 B2 | 8/2011 | Lubecki | |
| 8,162,408 B2 | 4/2012 | Mercat et al. | |
| 8,985,707 B1 | 3/2015 | Connolly | |
| 8,985,708 B2 | 3/2015 | Connolly | |
| 9,505,261 B2 | 11/2016 | Connolly | |
| 9,597,925 B2 | 3/2017 | Connolly | |
| 9,636,943 B2 | 5/2017 | Connolly | |
| 9,682,596 B2 * | 6/2017 | Connolly | B60B 1/0261 |
| 10,201,999 B2 * | 2/2019 | Connolly | B60B 1/0261 |
| 2001/0054840 A1 | 12/2001 | Schlanger | |
| 2003/0090141 A1 | 5/2003 | Dietrich | |
| 2004/0222690 A1 | 11/2004 | Okajima | |
| 2005/0194835 A1 | 9/2005 | Chen | |
| 2006/0138855 A1 | 6/2006 | Schalnger | |
| 2007/0080577 A1 | 4/2007 | Fioravanti | |
| 2008/0054710 A1 | 3/2008 | Spahr et al. | |
| 2009/0057179 A1 | 3/2009 | Addink | |
| 2011/0215636 A1 | 9/2011 | Huang | |
| 2012/0074761 A1 | 3/2012 | Walthert | |

* cited by examiner

METHOD OF MANUFACTURING A LIGHTWEIGHT WHEEL WITH HIGH STRENGTH FLEXIBLE SPOKES

RELATED APPLICATION

This application is a continuation, and claims the benefit of priority to U.S. Utility patent application Ser. No. 15/597,449 filed May 17, 2017 and issued as U.S. Pat. No. 10,201,999, which in turn claims priority to U.S. Utility patent application Ser. No. 14/519,312 filed Oct. 21, 2014, issued as U.S. Pat. No. 9,682,596, which further claims the benefit of priority to, U.S. Utility patent application Ser. No. 13/492,573 entitled "Wheel With High Strength Flexible Spokes," filed Jun. 8, 2012 and now U.S. Pat. No. 8,985,708, which is a continuation-in-part of, and claims the benefit of priority to, U.S. Utility patent application Ser. No. 13/487,253 entitled "Wheel With Flexible Wide-Body Spokes," filed Jun. 4, 2012 and now U.S. Utility Pat. No. 8,985,707.

FIELD OF INVENTION

The present invention is directed to vehicular wheels having high-strength and light-weight spokes, particularly bicycle, motorcycle, and wheelchair wheels.

BACKGROUND OF INVENTION

The most common construction for bicycle wheels includes spokes made of stainless steel or other metal. While stainless steel is strong, it is also heavy. Therefore, the spokes must be made as thin as possible to make them as light as possible. However, the thinner the spoke, the less strength it has. The thicker the spoke, the stronger it is. Therefore, in making spokes of steel, there is a tradeoff between making the spokes strong and making them lightweight. Thus, there is a need for a wheel with spokes that can be both lightweight and strong without having to deal with this tradeoff between the two. Another problem with steel spokes is that, if they are bent, they weaken and ultimately fail such that they must be replaced if bent.

One solution to this problem was presented in U.S. Pat. No. 5,110,190 which issued to Harold Johnson on May 5, 1992, for an invention entitled "High Modulus Multifilament Spokes And Method" (hereinafter the "'190 patent"). The '190 patent is fully incorporated herein by this reference. The '190 patent discloses a high modulus multifilament non-rigid and rigid wheel spoke that includes a fiber mid-portion between a first and second end having attachment members affixed thereto. The '190 patent also discloses methods of supporting a hub within a wheel rim by means of a plurality of spokes or by means of continuous lengths of spokes.

While the device presented in the '190 patent clearly made advancements over the state of the art at that time, the device nevertheless has its shortcomings. For instance, the small diameter of the filament spokes requires that the spokes be maintained in a substantially axial arrangement with its connectors. This, unfortunately, makes the manufacturing of wheels incorporating the '190 technology more difficult due to the off-axis tension. Specifically, even though the spokes of the '190 patent are orders of magnitude stronger than their metallic counterparts, the strength of the '190 spokes is slightly decreased from its maximum strength due to the bend in the spokes as they leave the wheel rim when installed in a wheel.

U.S. Pat. No. 6,036,281 which issued on Mar. 14, 2000, to Richard Campbell and entitled "Low Rotational Mass Bicycle Wheel System" (hereinafter the '281 patent), disclosed a bicycle wheel system having spokes extending radially from hub to spoke. The spokes are provided with fittings at its rim end which are constructed with minimal mass and fittings at the hub end which allow adjustment of the tension of the spoke. The spokes are constructed of a bundle of liquid crystal fibers having no significant creep surrounded by an extruded plastic jacket.

While the spoke presented in the '281 patent certainly represents a milestone in bicycle wheel technology and light-weight wheel manufacturing, it nevertheless has its challenges with implementation. First of all, there are manufacturing challenges in keeping the spokes aligned with their connectors. In narrow-width wheel applications, the device disclosed in the '281 are difficult to install as the alignment is important. This alignment results in increased assembly costs and overall product costs.

The present invention resolves these problems by providing spokes that are both lighter in weight than steel and significantly stronger than steel, and that are flexible such that they can bend without suffering damage. Moreover, due to their significant strength and durability, fewer numbers of spokes are required on wheels while still providing a lightweight wheel with superior strength.

SUMMARY OF THE INVENTION

The wheel with high strength flexible spokes of the present invention provides the aforementioned advantages by providing a wheel including a rim, a hub, and spokes between the rim and hub made of fibrous material that causes the spokes to be both lighter in weight and stronger than comparable steel spokes. The spokes are also flexible and resilient such that they can bend while retaining their integrity and strength.

Alternative embodiments of the wheel with high strength flexible spokes of the present invention include nipples for use within the wheel rims that provide flexibility in the angle which the spoke extends from the rim towards the wheel hub. A shortened nipple which sits fully within the rim such that the collar rests firmly against the inside of the rim and is accessible through the access hole formed in the rim is secured using a blade key received within a keyway for installation. An alternative embodiment includes a nipple formed to have a shoulder that is rounded and can pivot slightly within the rim to accommodate a slight departure angle for the spoke, and is held in place using a key corresponding to a keyway. The rounded nipple is sized to be received fully within the rim of a wheel and is formed with a rounded surface to mate closely with the internal surface of a wheel rim, such that the rounded nipple can be secured in place with the spoke extending from the wheel at an angle, while maintaining the straightness of the spoke.

In another alternative embodiment, the rim is formed with spoke holes configured to retain the nipples while allowing the nipples to rotate within the spoke holes. The hubs are formed with anchor holes which are also configured to retain anchors while allowing the anchors to rotate within the anchor holes. The spokes, having a first end with an attached tube and a second end having attached anchor, is inserted with the first end first through anchor hole and subsequently slid through the anchor hole until the tube contacts a corresponding nipple. The tube is threadably received by the nipple and threaded into the nipple, thereby seating the anchor into anchor hole and pulling the high strength flexible spoke taut. The configuration of the anchor hole with its corresponding spoke hole allows the high strength flexible spoke to extend in a straight line from the anchor hole to the spoke hole, preventing the formation of any bends within the spoke resulting in an even distribution of forces along the high strength flexible spoke.

BRIEF DESCRIPTION OF DRAWINGS

The aforementioned and other advantages of the wheel with flexible spokes of the present invention will become more apparent to those skilled in the art upon making a thorough review and study of the following detailed description of the invention when reviewed in conjunction with the drawings in which like references numerals refer to like parts, and wherein.

DETAILED DESCRIPTION OF THE INVENTION

Figure 1:
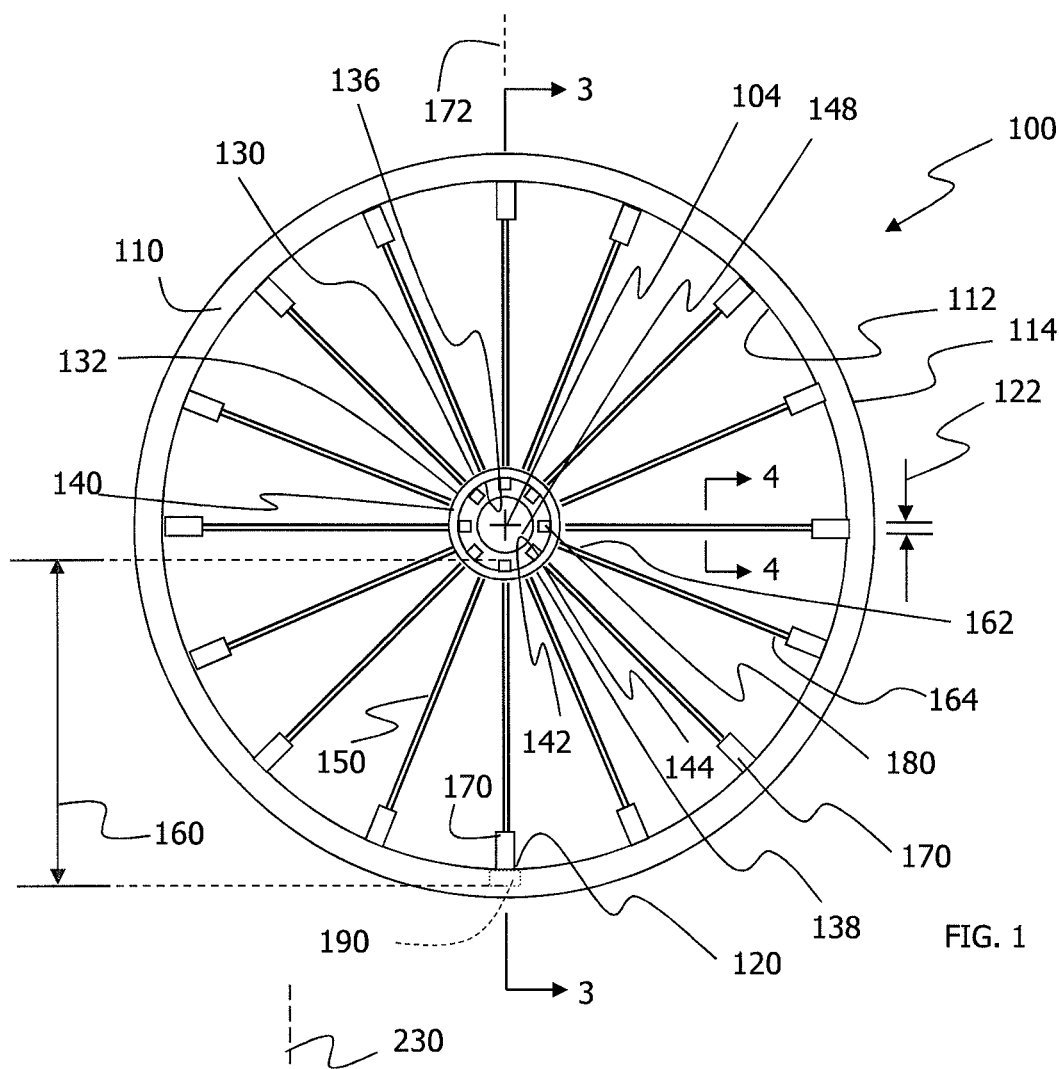
FIG. 1 is a side view of a first preferred embodiment of the wheel with flexible spokes of the present invention, showing the rim, hub, spokes between rim and hub, tubes attaching each spoke to the rim, and anchors attaching each spoke to the hub.

Referring to FIG. 1, a side view of a first preferred embodiment of the wheel with flexible spokes of the present invention is shown and generally designated 100. In FIG. 1, the side of wheel 100 facing the viewer can be referred to as the right side of the wheel 100. The side of wheel 100 opposite the right side can be referred to as the left side of the wheel 100. The wheel 100 has a wheel axis 104, and a rim 110 which has an inner perimeter 112 and an outer perimeter 114.

Figure 2:
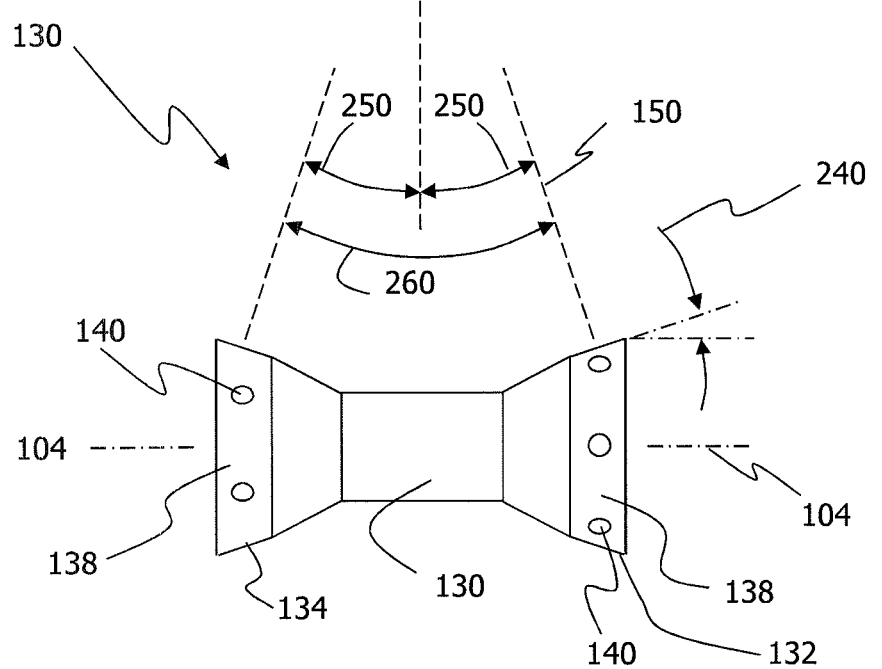
FIG. 2 is a rear detail view of the first preferred embodiment of the wheel with flexible spokes of the present invention, showing the hub, the angle between spokes on the left side of the wheel and spokes on the right side of the wheel, and the angle of the hub surface at the point of attachment of each spoke to the hub.
Figures 3, 4:
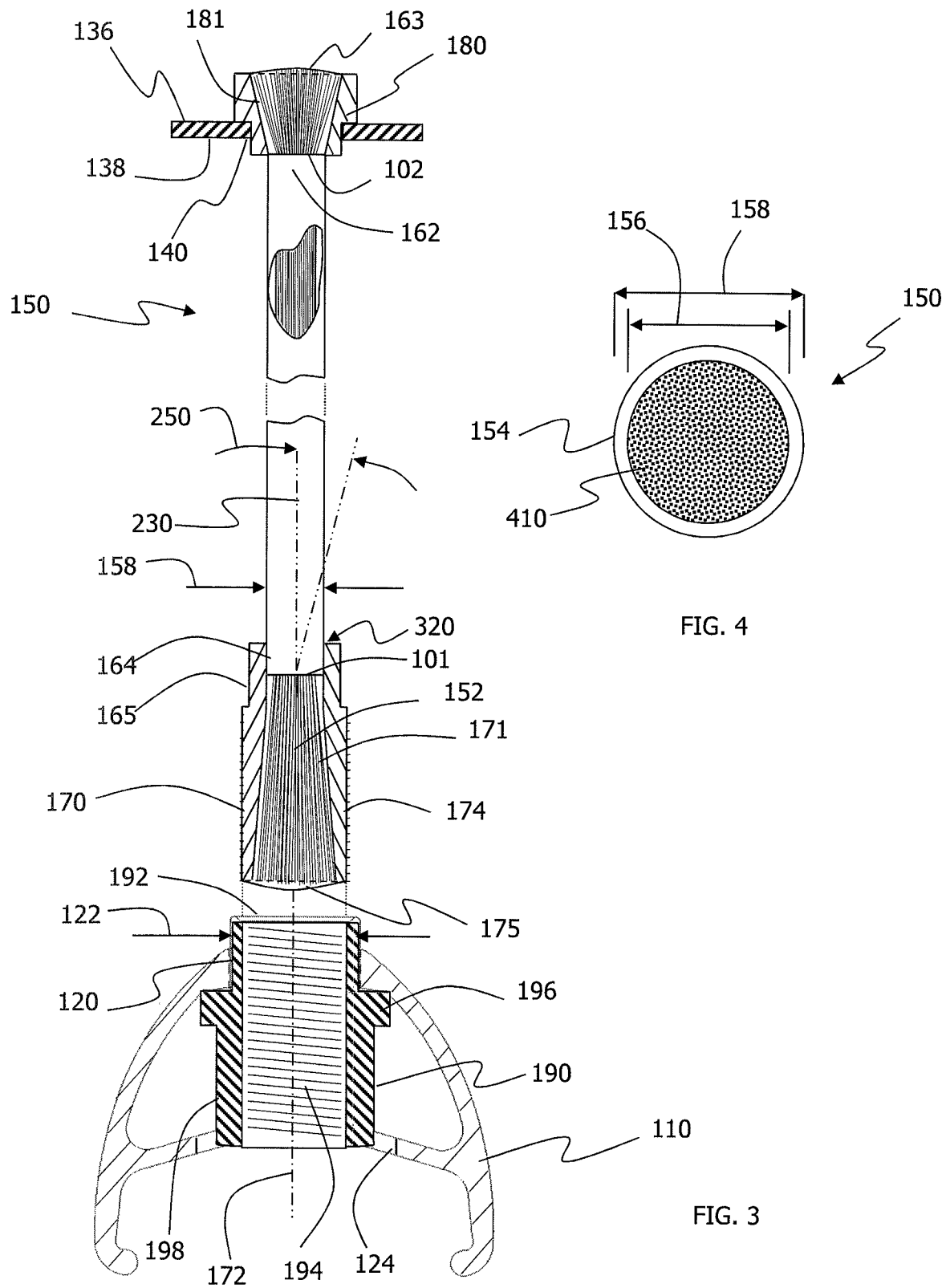
FIG. 3 is a cross-sectional view of the first preferred embodiment of the wheel with flexible spokes of the present invention, taken across line 3-3 of FIG. 1, showing cross-sectional portions of the rim and hub, and showing how each tube attaches each spoke to the rim via a nipple in the rim, and how each anchor attaches each spoke to the hub.
FIG. 4 is a cross-sectional view of the first preferred embodiment of the wheel with flexible spokes of the present invention, taken across line 4-4 of FIG. 1, showing a cross-sectional view of the fibers and jacket of one of the spokes.

Still referring to FIG. 1, with reference to FIGS. 2-4, distributed symmetrically along inner perimeter 112 are spoke holes 120. Each spoke hole 120 has a spoke hole width 122. Along the outer perimeter 114 are nipple access holes 124 (not visible in FIG. 1), one nipple access hole 124 adjacent each spoke hole 120. Wheel 100 further includes a hub 130 having a right flange 132 and a left flange 134 (not visible, behind right flange 132). Each flange 132 and 134 has an inner surface 136 and an outer surface 138. In each flange 132 and 134 are flange holes 140, each flange hole 140 corresponding to a unique spoke hole 120. Each flange hole 140 has an inner opening 142 in the corresponding inner surface 136, and an outer opening 144 in the corresponding outer surface 138. Hub 130 also has a barrel 148 which receives an axle of a bicycle.

Wheel 100 further includes non-rigid spoke members, or spokes 150. Each spoke 150 has non-rigid fibers 152 covered by a jacket 154 having an inner diameter 156 and an outer diameter 158 which is also the width 158 of spoke 150. Each spoke 150 has a length 160. Fibers 152 are substantially continuous along the length 160 of spoke 150. Alternatively, one or more of fibers 152 may be shorter than length 160 of spoke 150.

Each spoke 150 has an inner end 162 adjacent hub 130, and an outer end 164 adjacent rim 110. Each spoke 150 has a tube 170 about its outer end 164, and each tube 170 is formed with a tapered bore 171 opening away from the midpoint of the spoke. Each tube 170 is affixed to its corresponding outer end 164 by inserting the fibers 152 into the tube 170, and filling the tube 170 with epoxy 175. Once hardened, the epoxy 175 and fibers 152 form a wedge within the tapered bore 171 such that any tension on the spoke draws the hardened wedge against the tapered bore 171 thereby securing the fiber 152 within the tube 170. Alternatively, tube 170 may be affixed to outer end 164 by any other material of similar strength.

Tube 170 may be equipped with a hexagonal, reinforced head 165 which provides for added strength at the hub-end of the tube 170. This is helpful in preventing breakage for a non-axial tension on spoke 150, and facilitates the tightening of spoke 150.

Each tube 170 has a tube axis 172 and external spoke threads 174. Each spoke 150 also has an anchor (or eyelet or ferrule) 180 about its inner end 162. Each anchor 180 is formed with a tapered bore 181 opening away from the midpoint of the spoke. Each anchor 180 is affixed to its corresponding inner end 162 by inserting the fibers 152 into the anchor 180, and filling the tapered bore 181 with epoxy 163. Once hardened, the epoxy 163 and fibers 152 form a wedge 102 (shown in FIGS. 3 and 5-9) within the tapered bore 181 formed in the anchor 180 such that any tension on the spoke 150 draws the hardened wedge 102 against the tapered bore 181 thereby securing the fiber 152 within the anchor 180. Alternatively, anchor 180 may be affixed to inner end 162 by any other material of similar strength.

Each flange hole 140 is wider than spoke 150 but narrower than anchor 180, such that tube 170 about outer end 164 can be passed through inner opening 142 and outer opening 144, such that the rest of spoke 150 can then be passed through flange hole 140 until anchor 180 comes into contact with inner surface 136 around inner opening 142, which causes inner end 162 to be retained in flange hole 140 by anchor 180.

Wheel 100 also includes nipples 190. One nipple 190 is shown in FIG. 1 in broken line, inside rim 110. There is a nipple 190 between each spoke hole 120 and its corresponding nipple access hole 124. Each nipple 190 has a nipple opening 192, nipple threads 194 inside nipple opening 192, a collar 196, and a nipple head 198. Once each spoke 150 is passed through flange hole 140 until anchor 180 comes into contact with inner surface 136 around inner opening 142, tube 170 is positioned and threaded into the corresponding nipple 190 via inter-engagement of spoke threads 174 with nipple threads 194. This causes tube 170 to be retained in nipple 190 such that tube axis 172 is perpendicular to wheel axis 104 (shown in FIG. 1). The retention of tube 170 in nipple 190 and of inner end 162 in flange hole 140 by anchor 180, causes spoke 150 to be held taut between rim 110 and hub 130.

FIG. 1 shows eight (8) spokes 150 attached to right flange 132, and eight (8) spokes 150 attached to left flange 134 (not visible, behind right flange 132), for a total of sixteen (16) spokes 150. Wheel 100 may alternatively have more or fewer than sixteen (16) spokes 150. For example, wheel 100 may have twelve (12) spokes 150, six (6) spokes 150 attached to each of flanges 132 and 134. While it is also possible to have different numbers of spokes 150 attached to each of flanges 132 and 134, having the same number of spokes attached to each of flanges 132 and 134 balances the load on the flanges 132 and 134.

FIG. 2 is a rear view of hub 130. FIG. 2 shows the angle that one of the spokes 150 is attached to right flange 132, and the angle that one of the spokes 150 is attached to left flange 134. In FIG. 2, the right side of wheel 100 is on the right side of FIG. 2, and the left side of wheel 100 is on the left side of FIG. 2. Broken line 230 in FIG. 2 represents a plane 230 that bisects wheel 100 between the right side and left side of wheel 100. Plane 230 is perpendicular to wheel axis 104. Each outer surface 138 has the shape of a conical section that has an angle 240 to wheel axis 104. Each spoke 150 extends perpendicularly from the corresponding outer surface 138. Therefore, each spoke 150 extends from outer surface 138 at an angle 250 to plane 230. This means that the magnitude of angle 260 between spoke 150 attached to right flange 132 and spoke 150 attached to left flange 134, is twice the magnitude of angle 250.

FIG. 3 shows a partial cross-sectional detail view of a spoke 150 with its inner end 162 retained in flange hole 140 by anchor 180, and tube 170 about to be received in nipple 190 in rim 110. FIG. 3 shows how nipple 190 is retained in spoke hole 120. Spoke hole width 122 allows the portion of nipple 190 around nipple opening 192 to pass through spoke hole 120, but does not allow collar 196 to pass through spoke hole 120, such that nipple is retained in spoke hole 120 by the tension of spoke 150 on nipple 190 once tube 170 is threaded into nipple 190. FIG. 3 also shows spoke threads 174 which inter-engage with nipple threads 194 to thread tube 170 into nipple 190. With tube 170 retained in nipple 190, tube axis 172 is perpendicular to wheel axis 104 (not shown) and intersects the corresponding spoke hole 120. Spoke holes 120 lie in plane 230. While spoke holes 120 may alternatively be adjacent plane 230, spoke holes 120 being in plane 230 causes the forces of spokes 150 to be placed on rim 110 where plane 230 intersects rim 110, which is the middle of the inner perimeter 112 of rim 110. With spoke holes 120 in plane 230, and each tube 170 received in the corresponding nipple 190, tube axis 172 also lies in plane 230.

In FIG. 3, tube axis 172 coincides with the broken line representing plane 230. However, because each spoke 150 extends at angle 250 to plane 230, each spoke 150 extends from its tube 170 at angle 250 to tube axis 172. This means that there is a bend in spoke 150 at an angle 250 at the point 320 where spoke 150 protrudes from tube 170. With steel spokes, such a bend would weaken the spoke and ultimately cause the spoke to fail. However, with spokes 150, such a bend does not damage spokes 150, because fibers 152 are flexible and resilient yet strong such that spokes 150 retain their integrity and strength even when bent under tension in the manner described. Therefore, spokes 150 can bend without weakening or failing. Furthermore, each of spokes 150 is three times as strong, and weighs half as much, as a steel spoke that would otherwise be used in its place. This allows the width 158 of each of spokes 150 to be greater than that of a steel spoke that would be used in its place. In the alternative, the width 158 of each spoke 150 may be less than or equal to the width of a steel spoke that would be used in its place; the strength of each of spokes 150 may be greater or less than three times that of a steel spoke that would be used in its place; and the weight of each of spokes 150 may be greater or less than half that of a steel spoke that would be used in its place.

Rim 110, hub 130, tube 170, anchor 180 and nipple 190, in a preferred embodiment, are made of aluminum. Alternatively, any of rim 110, hub 130, tube 170, anchor 180 or nipple 190 may be made of any other material of comparable strength. In a preferred embodiment of the present invention, fibers 152 are a bundle of thermotropic liquid crystal fibers that exhibit high strength, low creep, and weather resistance. For instance, such fibers could be PBO Zylon® fiber, a strong yet lightweight fiber, available from Toyobo®. Alternatively, fibers 152 may be made of any other material having comparable weight and strength. Jacket 154 is made of Rilsan®, a high-performance polyamide. Alternatively, jacket 154 may be made of any other material having comparable weight and strength. Each nipple access hole 124 allows access to nipple head 198 so that it can be turned to facilitate the threading of nipple 190 onto tube 170. For instance, a hexagonal head nut-driver may be positioned over nipple 190 and rotated to tighten spoke 150 in place.

FIG. 4 shows a cross-sectional detail view of the inside of a spoke 150, showing the fibers 152, and inner diameter 156 of jacket 154. Fibers 152 are gathered in forty-four (44) bundles 410 made of nine-hundred and ninety-six (996) filaments each, for a total of 43,824 filaments in single spoke 150. The large number of filaments is one factor contributing to the increased strength of spoke 150, while minimizing the weight of spoke 150. Spoke 150 has a breaking strength of 3,600 pounds. Alternatively, the number of bundles 410 may be greater or less than forty-four (44). Additionally, the the weight of each of spokes 150 may be greater or less than half that of a steel spoke that would be used in its place.

Rim 110, hub 130, tube 170, anchor 180 and nipple 190, in a preferred embodiment, are made of aluminum. Alternatively, any of rim 110, hub 130, tube 170, anchor 180 or nipple 190 may be made of any other material of comparable strength. In a preferred embodiment of the present invention, fibers 152 are a bundle of thermotropic liquid crystal fibers that exhibit high strength, low creep, and weather resistance. For instance, such fibers could be PBO Zylon® fiber, a strong yet lightweight fiber, available from Toyobo®. Alternatively, fibers 152 may be made of any other material having comparable weight and strength. Jacket 154 is made of Rilsan®. Alternatively, jacket 154 may be made of any other material having comparable weight and strength. Each nipple access hole 124 allows access to nipple head 198 so that it can be turned to facilitate the threading of nipple 190 onto tube 170. For instance, a hexagonal head nut-driver may be positioned over nipple 190 and rotated to tighten spoke 150 in place.

FIG. 4 shows a cross-sectional detail view of the inside of a spoke 150, showing the fibers 152, and inner diameter 156 of jacket 154. Fibers 152 are gathered in forty-four (44) bundles 410 made of nine-hundred and ninety-six (996) filaments each, for a total of 43,824 filaments in single spoke 150. The large number of filaments is one factor contributing to the increased strength of spoke 150, while minimizing the weight of spoke 150. Spoke 150 has a breaking strength of 3,600 pounds. Alternatively, the number of bundles 410 may be greater or less than forty-four (44). Additionally, the number of filaments in each bundle 410 may be greater or less than 996. As a result, the breaking strength of spoke 150 may be greater or less than 3,600 pounds.

Figure 5:
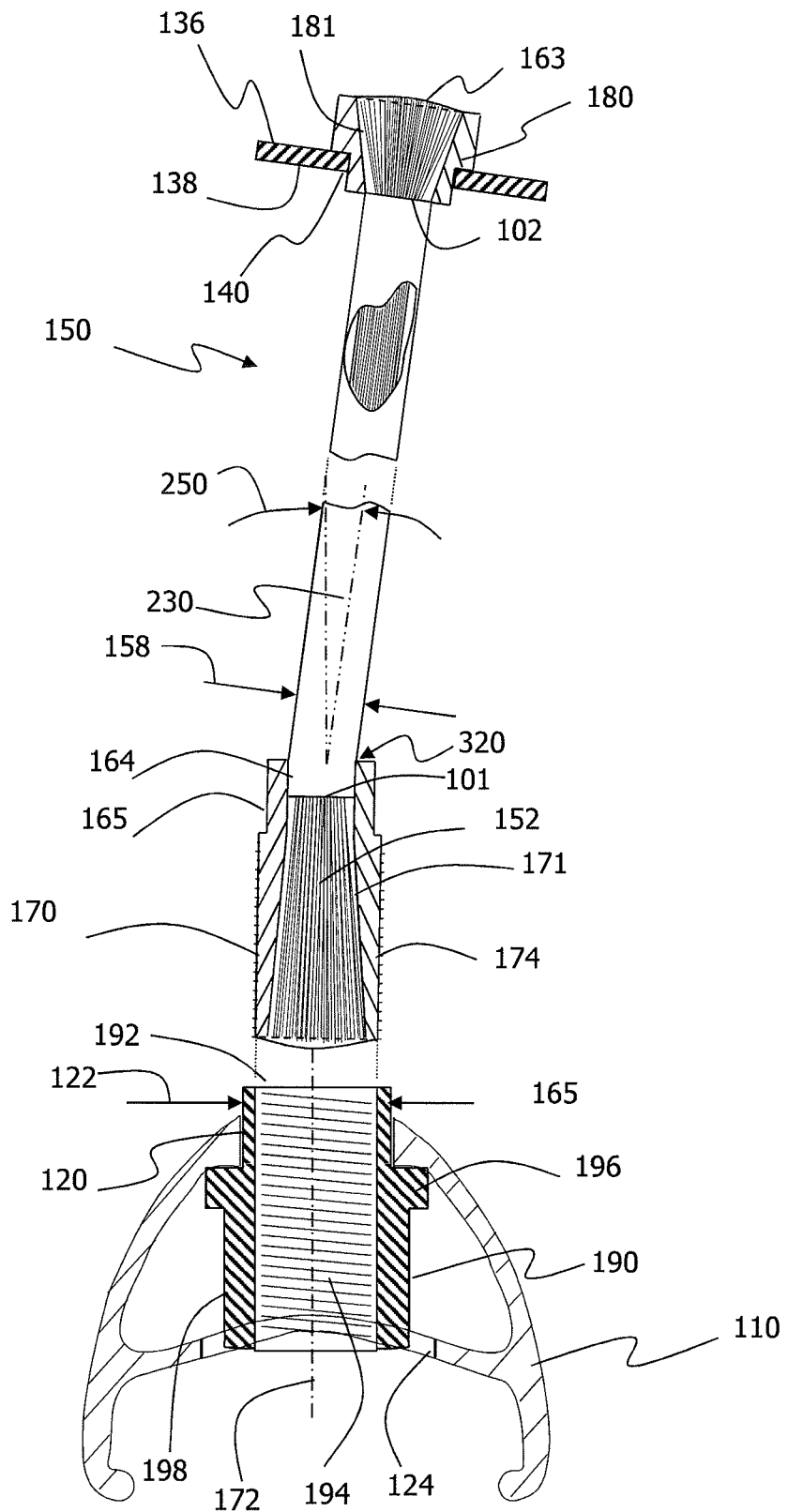
FIG. 5 is a cross-sectional view of the first preferred embodiment of the wheel with flexible spokes of the present invention showing cross-sectional portions of the rim and hub, and showing how each tube, once attached to the rim, would extend away at an angle from the nipple in the rim.

Referring to FIG. 5, a cross-sectional view of the first preferred embodiment of the wheel with flexible spokes of the present invention showing cross-sectional portions of the rim and hub is shown. As can be appreciated from FIG. 5, the width of rim 110 is just slightly wider than the width of nipple 190. As a result, it is necessary that the nipple be aligned so that the tube extends radially inward from rim 110. Because of this positioning, it is important that spoke 150 be flexible as it leaves tube 190 so as to accommodate angle 250 without any decrease in strength and durability. Due to the number of fiber strands contained within spoke 150, there is no noticeable decrease in strength despite the off-axis tension.

When tension is applied to spoke 150, collar 196 strikes the inside surface of rim 110 and maintains the nipple 190, and corresponding sleeve, in its perpendicular arrangement.

Referring now to FIGS. 6 through 9, a number of alternative embodiments of the wheel with high strength flexible spokes of the present invention are shown and include variations on the nipple and rim.

Figure 6:
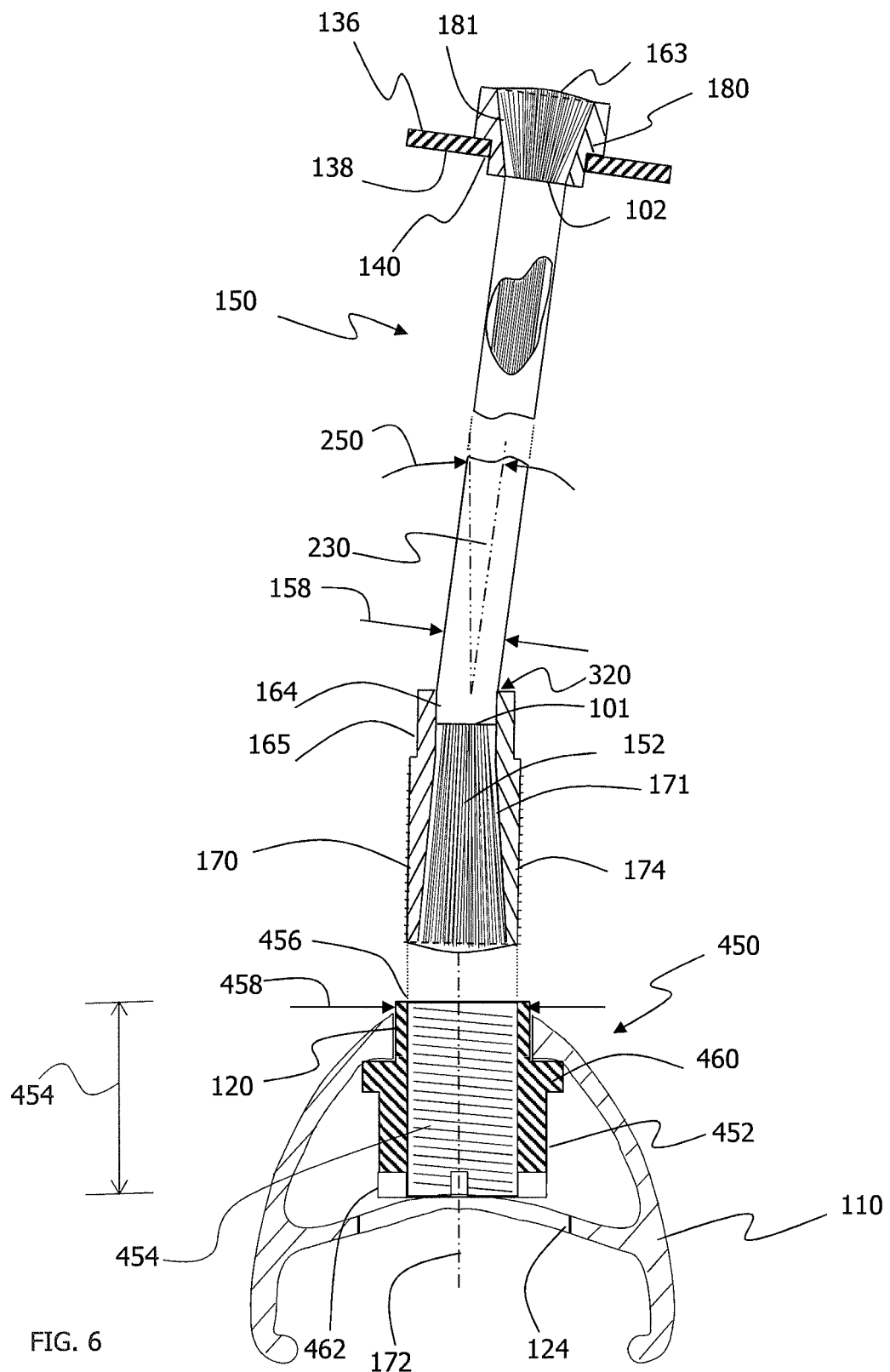
FIG. 6 is a cross-sectional view of an alternative embodiment of the wheel with high strength flexible spokes of the present invention showing cross-sectional portions of the rim and hub, and showing a shortened nipple sized to be fully received within the rim and formed with a keyway to receive a key when secured during assembly of the wheel, and with the spoke extending away at an angle from the nipple in the rim.

Referring initially to FIG. 6, the wheel with high strength flexible spokes of the present invention is shown and includes a shortened nipple generally designated 450. Shortened nipple 450 is sized to be fully received within the rim 110. Nipple 450 includes a nipple head 452 and a collar 460 sized to rest against the interior of the rim 110 and allow nipple opening 456 with diameter 458 to pass through spoke hole 120. Shortened nipple 450 is formed with a threaded bore 454 passing longitudinally along axis 172 from nipple opening 456. Threaded bore 454 is sized to threadably receive head tube 170.

Shortened nipple 450 is formed with a keyway 462 to receive a key when secured during assembly of the wheel. More specifically, nipple head 452 is formed with a pattern of keyways 462 to receive a correspondingly shaped key to maintain the rotational position of nipple 450 along axis 172 during the installation of spoke 150. By inserting a key into keyways 462, the nipple 450 may be held in place while head tube is rotated such that head tube threads 174 enter nipple 450.

As shown in FIG. 6, spoke 150 may extend away from axis 172 by an angle 250 as described in conjunction with alternative embodiments.

Figure 7:
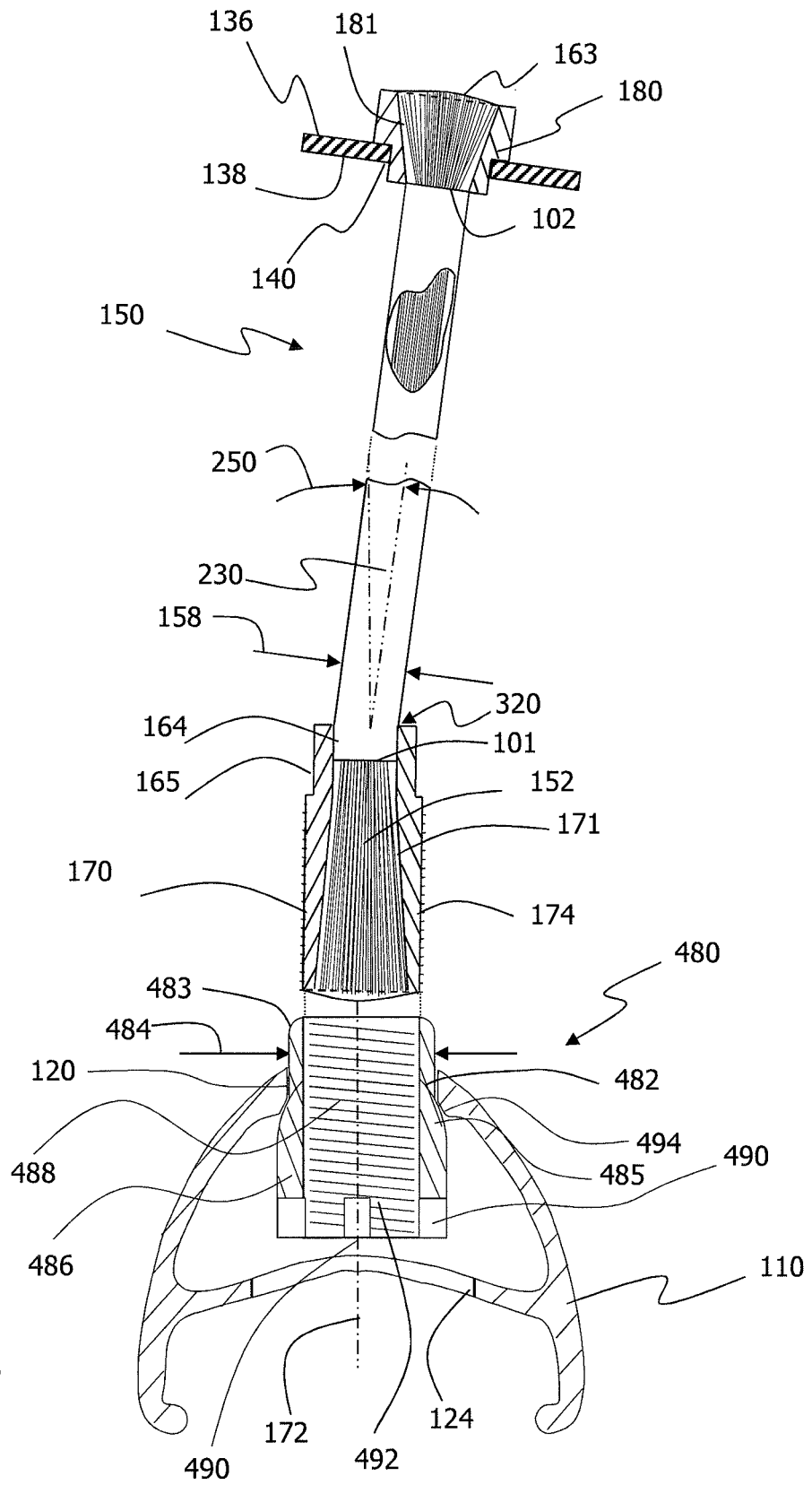
FIG. 7 is a cross-sectional view of an alternative embodiment of the wheel with high strength flexible spokes of the present invention showing portions of the rim and hub, and showing a shouldered nipple sized to be fully received within the rim and formed with a keyway to receive a key when secured during assembly of the wheel, and with the shouldered nipple pivoting slightly within the rim to adjust for slight angular adjustments within the rim, and the spoke extending away at an angle from the nipple in the rim.

Referring now to FIG. 7, a cross-sectional view of an alternative embodiment of the wheel with high strength flexible spokes of the present invention is equipped with a shouldered nipple generally designated 480. Shouldered nipple 480 includes an insert 482 having a diameter 484 which is slightly less than the diameter of spoke hole 120 of rim 110. Shoulder 485 is larger in diameter than insert diameter 484 such that the shoulder 485 rests on the inside surface of rim 110.

Shouldered nipple 480 is formed with a threaded bore 488 which passes from nipple opening 483 through to nipple head 486, and includes threads 492 matching threads 174. Threaded bore 488 is sized to threadably receive threads 174 on tube head 170 during the assembly of the wheel with high strength flexible spokes of the present invention.

From FIG. 7 it can been seen that shoulder 485 is rounded and corresponds with a mating surface 494 on rim 110 such that the axis 172 of nipple 480 may vary slightly within rim 110. Specifically, the mating surface 494 allows the shouldered nipple 480 to pivot slightly within the rim 110 to accommodate slight angular adjustments within the rim, such that the spoke 150 can extend away at an angle 250 from the nipple 480 and rim 110.

A number of keyways 490 are formed in nipple head 486 such that a corresponding key (not shown) can be inserted into keyways 490 to maintain the rotational position of nipple 480 during the threading of tube head 170 into threaded bore 488, and when tightening the spoke 150 using hexagonal head 165. Also, nipple 480 is sized to be fully received within access hole 124 in rim 100.

Figures 8, 9:
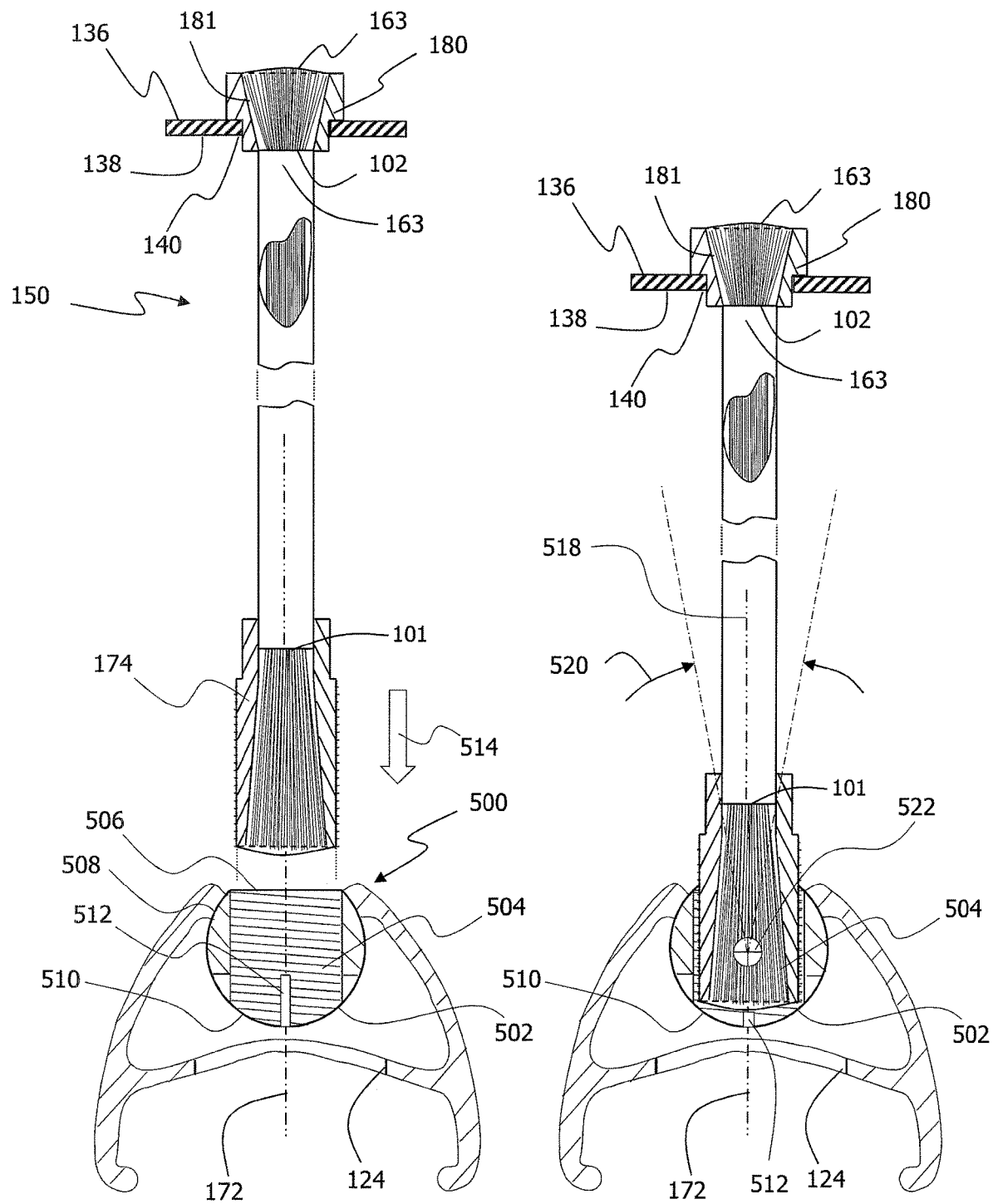
FIG. 8 is a cross-sectional view of an alternative embodiment of wheel with high strength flexible spokes of the present invention showing cross-sectional portions of the rim and hub, and showing a spherical nipple sized to be fully received within the rim and formed with a keyway to receive a key when secured during assembly of the wheel.
FIG. 9 is a cross-sectional view of the alternative embodiment of wheel with high strength flexible spokes of the present invention showing cross-sectional portions of the rim and hub, showing the spherical nipple rotating within the rim to accommodate the angular positioning of a spoke extending away from the rim with little or no angular change with the tube head and spoke.

Referring now to FIGS. 8 and 9, cross-sectional views of an alternative embodiment of wheel with high strength flexible spokes of the present invention showing cross-sectional portions of the rim and hub, and showing a spherical, or rounded, nipple generally designated 500. Rounded nipple 500 is formed with a spherical or near spherical body 502 having a bore 506 along axis 172 and formed with threads 504 through end 510.

Rim 110 is formed with nipple seat 508 that is shaped to receive rounded nipple 500 to retain nipple 500 in position along axis 172 of rim 100. FIG. 9 depicts the insertion of a spoke 150 into rounded nipple 500 by threadably rotating spoke 150 along axis 518 and advancing the spoke 150 in direction 514.

Figure 10:
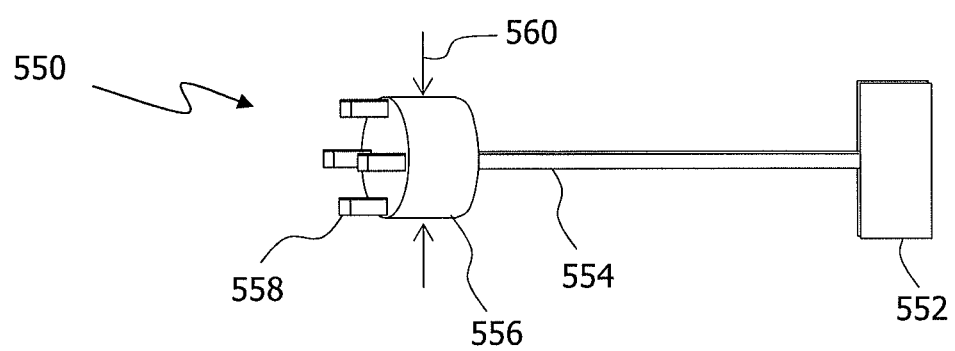
FIG. 10 is an exemplary embodiment of a key for tightening the high strength flexible spokes of the present invention, and includes a handle having a shaft leading to a head formed with a number of keys sized and positioned to cooperatively engage the keyways on nipples of the present invention.

Rounded nipple 500 is formed with a number of keyways 512 sized to receive a key, such as the key 550 shown in FIG. 10, having a handle 552 and a shaft 554 leading to a head 556 formed with keys 558 positioned and sized to correspond to keyways 512 on rounded nipple 500. It is to be appreciated that the number, size, positioning of the keys 558 may vary to accommodate keyway size, shapes, and patterns of nipples described herein.

Head 556 of key 550 is formed to have a diameter 560 that is less than the diameter of access hole 124. Accordingly, key 550 can be inserted into rim 110 during the wheel assembly process to engage keys 558 into keyways 512 to maintain the rotational position of rounded nipple 500 as head tube 170 is threaded into nipple 500.

Also from FIG. 9, the rotation of rounded nipple 500 within rim 110 is shown. Rounded nipple 500 rotates within the rim 110 to accommodate the angular positioning of a spoke 150 extending away from the rim 110 with little or no angular change with the tube head and spoke. Specifically, rounded nipple 500 rests against nipple seats 508 and can rotate about a center of rotation 522 such that the axis 518 of tube head 174 can move within range 520. This range 520 allows the spoke 150 to maintain a relatively straight line between tube head 174 and anchor 180 of hub 130. This straightness along axis 518 provides additional strength as all fibers 152 within spoke 150 are stressed similarly along the longitudinal axis of the spoke.

Referring now to FIG. 10, an exemplary embodiment of a key tool for tightening the high strength flexible spokes of the present invention is shown and generally designated 550. Key tool 550 includes a handle 552 having a shaft 554 leading to a head 556 formed with a number of keys 558 sized and positioned to cooperatively engage the keyways on nipples of the present invention. The diameter 560 of head 556 is intended to be sized to be insertable through the access hole 124 in the rim 110 as disclosed herein to engage the nipples described to facilitate the high strength flexible spokes of the present invention. It is to be appreciated that the key tool 550 is shown in FIG. 10 to have four keys 558 which, in a preferred embodiment, correspond to the inserts shown to have four keyways. It is to be appreciated further, that the number, size and positioning of keys 558 can vary to accommodate a nipple formed with different configurations of keyways.

Figure 11:
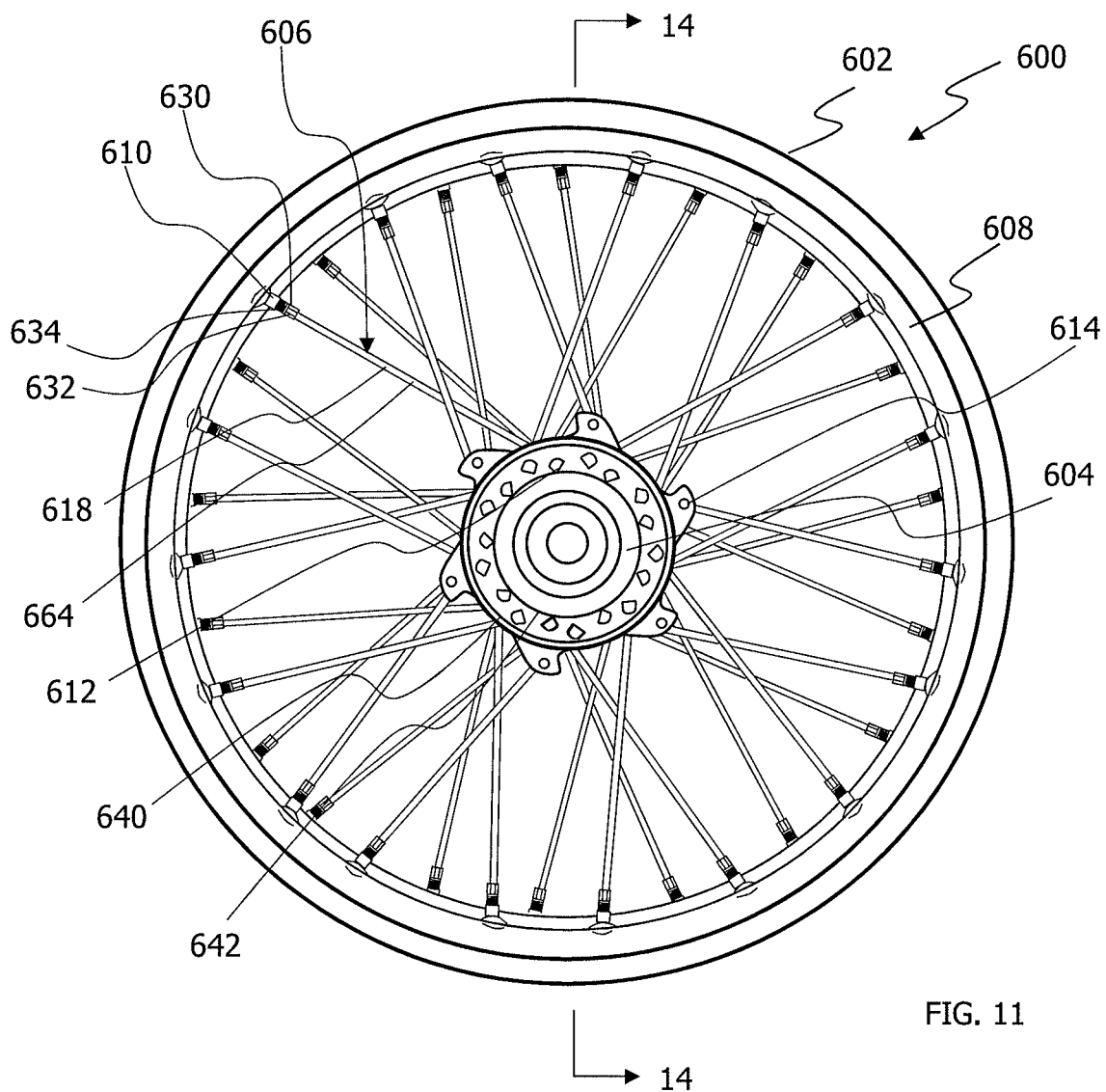
FIG. 11 is a side view of an alternative embodiment of the wheel with flexible spokes of the present invention, showing the rim, hub, spokes between rim and hub, tubes attaching each spoke to the rim, and anchors attaching each spoke to the hub.

Referring now to FIG. 11, a side view of an alternative embodiment of the wheel with high strength flexible spokes of the present invention is shown and generally designated 600. In the alternative embodiment of the present invention, the wheel 600 is constructed to be used in heavy duty and extremely demanding applications requiring greater strength, stability, and rigidity, such as for use in motorcycles. The wheel 600 includes a hub 604, a plurality of spokes 606, a rim 608, and a tire 602.

In the alternative embodiment, the hub 604 and rim 608 are constructed of aluminum. Alternatively, hub 604 and rim 608 may be made of any other material of comparable strength. The hub 604 and rim 608 are constructed having thicker walls and larger surface areas as compared to the alternative embodiments aforementioned. The increase in size of the hub 604 and rim 608 increases the structural strength and durability of each part. The hub 604 has a disc brake mounting surface 614 which allows the attachment of a disc brake assembly.

Each spoke 606 includes a spoke shaft 618 having an anchor 612 attached to one end and a tube 630 attached to the opposite end. The spoke shaft 618 is substantially similar in construction to the flexible, non-rigid spokes of previous embodiments aforementioned. The spoke shaft 618 includes fibers 660 (shown in FIG. 13) disposed within a jacket 664. The number of fibers 660 used to construct spoke shaft 618 is increased to correspond with the increased strength requirements of the wheel 600. The increased number of fibers 660 thereby increases the internal diameter 662 (shown in FIG. 13) and external diameter 666 (shown in FIG. 13) of jacket 664. The tube 630 is formed with a first section having a hexagonal exterior 632 and a second section having a threaded exterior 634. The anchor 612 is formed with a body 626 (shown in FIG. 12) having a retaining shaft 624 (shown in FIG. 12) extending therefrom. The tube 630 and anchor 612 are constructed of aluminum or any other material of comparable strength.

The anchor 612 of each spoke 606 is retained by hub 604 and the threaded exterior 634 of tube 630 on the opposite end of the spoke 606 is threaded into a threaded bore 635 (shown in FIG. 12) of a corresponding nipple 610 retained within rim 608 of wheel 600, whereby the spoke shaft 618 projects and extends from the rim 608 to the hub 604 in a straight line. By extending from the nipple 610 and the tube 630 in a straight line it prevents bends from forming in the spoke shaft 618 at the point where the spoke shaft 618 protrudes from the nipple 610 and the tube 630, thereby equally spreading the force along each fiber 660 of the spoke shaft 618 and preventing concentrated forces. Each spoke 606 connects the hub 604 to the rim 608 at specific locations to maintain the hub 604 in the center of the rim 608 to form wheel 600.

The tire 602 is affixed onto the rim 608, thereby completing the assembly of wheel 600 which has greater strength, durability, and rigidity when compared to a similarly sized wheel made of steel components. Further, the wheel 600 is substantially lighter than a similarly sized steel wheel.

Figure 12:
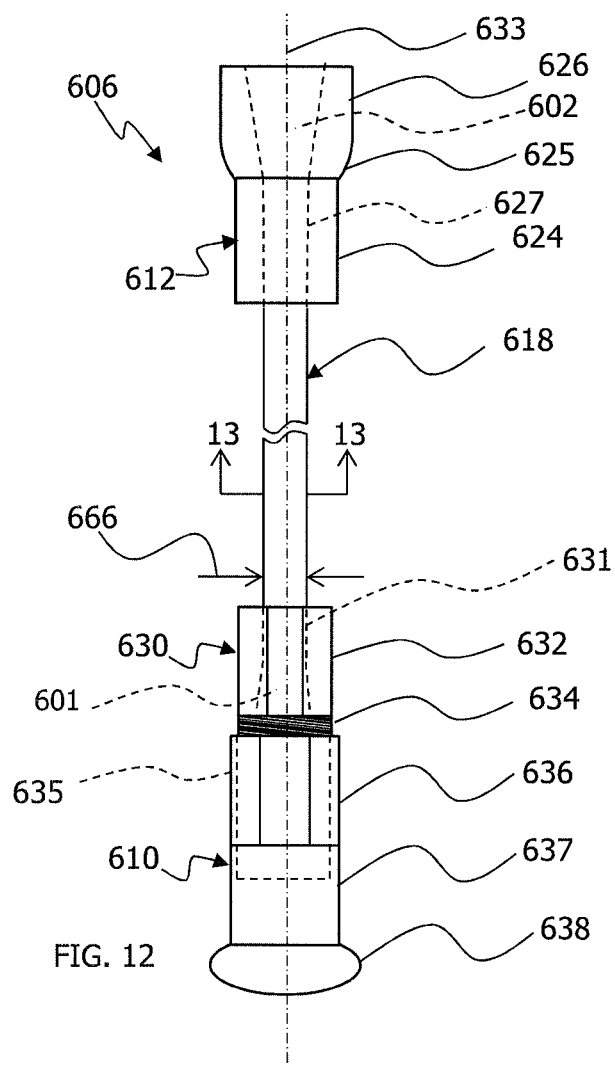
FIG. 12 is a front view of an alternative embodiment of the high strength flexible spoke of the present invention showing the spoke shaft having a tube attached to a first end and an anchor attached to a second end.

Referring now to FIG. 12, a side view of an alternative embodiment of spoke 606 of the present invention is shown. The spoke 606 includes a spoke shaft 618 with an attached anchor 612 located at one end and a tube 630 located at the opposite end. As shown, spoke 606 has a central axis 633 in which the centers of the anchor 612, spoke shaft 618, tube 630, and nipple 610 are aligned.

The anchor 612 is formed with a body 626 having curved shoulder 625 which transitions the body 626 into a retaining shaft 624 extending therefrom, where the body 626 has an eternal diameter larger than the external diameter of retaining shaft 624. The anchor 612 is further formed with a tapered bore 627 (shown in dashed lines), tapering from the body 626 towards the retaining shaft 624.

The tube 630 is formed with a first section having a hexagonal exterior 632 and a second section having a threaded exterior 634. The tube 630 is further formed with a tapered bore 631 (shown in dashed lines) tapering from the first section of the tube 630 having the hexagonal exterior 632 to the end of tube 630 having the threaded exterior 634.

Nipple 610 is formed with a body 637 having a hexagonal exterior 636 at one end and a spherical flange 638 attached at the opposite end. The nipple 610 is further formed with a threaded bore 635. The threads of the threaded bore 635 corresponds with the threads of threaded exterior 634 of tube 630, allowing tube 630 to be inserted and subsequently threaded into nipple 610, as shown. It is contemplated that tube 630 and nipple 610 may have alternative exterior shapes such as a square to allow the use of tools to grip onto the exterior of the tube 630 and the nipple 610 to aid in threading the tube 630 into the nipple 610.

Each anchor 612 is affixed to its corresponding end of spoke shaft 618 by inserting the fibers 660 (not shown) into the tapered bore 627 of anchor 612, and filling the tapered bore 627 with epoxy. Once hardened, the epoxy and fibers 660 form a wedge within the tapered bore 627 such that any tension on the spoke shaft 618 draws the hardened wedge against the tapered bore 627, thereby securing the spoke shaft 618 within the anchor 612. The use of epoxy is not meant to be limiting and it is contemplated that any other material of similar strength may be used. The spoke shaft 618 is affixed to tube 630 utilizing the same method. Alternatively, the spoke shaft 618 may be affixed to the anchor 612 and tube 630 using mechanical means such as utilizing a tapered crimp sleeve attached to fibers 660. Once attached, the tapered crimp sleeve forms a wedge such that any tension on the spoke shaft 618 draws the tapered crimp sleeve against the tapered bore 627 or 631, thereby securing the spoke shaft 618 within the anchor 612 and tube 630.

Figure 13:
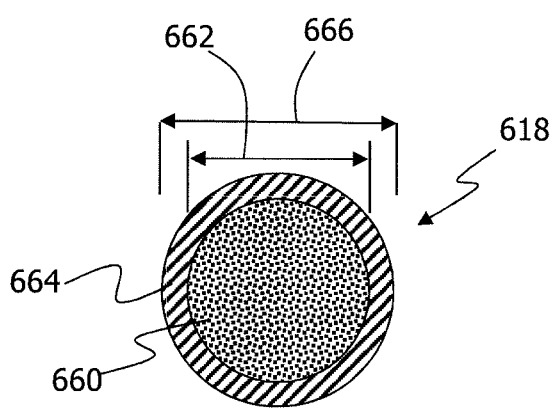
FIG. 13 is a cross-sectional view of the alternative embodiment of the spoke shaft of the present invention, taken across line 13-13 of FIG. 12, showing a cross-sectional view of the fibers and jacket of one of the spokes.

Referring now to FIG. 13, a cross-sectional view of a spoke shaft 618 taken at line 13-13 of FIG. 12 is shown. The spoke shaft 618 includes fibers 660 disposed within jacket 664 having internal diameter 662 and external diameter 666. The spoke shaft 618 is substantially similar in construction to the spokes of previous embodiments aforementioned. In the preferred embodiment as described above in FIG. 1, the fibers 152 of spoke 150 are gathered in forty-four (44) bundles, with each bundle made of nine-hundred ninety-six (996) filaments, for a total of 43,824 filaments in a single spoke shaft 618. The spoke 606 of the alternative embodiment of the present invention requires an increased level of strength as compared to spoke 150 of wheel 100, therefore the number of fibers 660 used to construct spoke shaft 618 is increased to meet the strength requirements of wheel 600. The increase in the number of fibers 660 thereby increases the internal diameter 662 and external diameter 666 of the jacket 664.

The fibers 660 are a bundle of thermotropic liquid crystal fibers that exhibit high strength, low creep, and weather resistance. For instance, such fibers could be PBO Zylon® fiber, a strong yet lightweight fiber, available from Toyobo®. Alternatively, fibers 660 may be made of any other material having comparable weight and strength characteristics. Jacket 664 is made of Rilsan®. Alternatively, jacket 664 may be made of any other material having comparable strength, weight, and durability characteristics. As a result of the materials used and construction method, the spoke 606 of the present invention is high-strength, non-rigid, flexible, and lightweight. Further, the spoke 606 has at least three times the strength while weighing approximately half that of a similar sized steel spoke.

Figure 14:
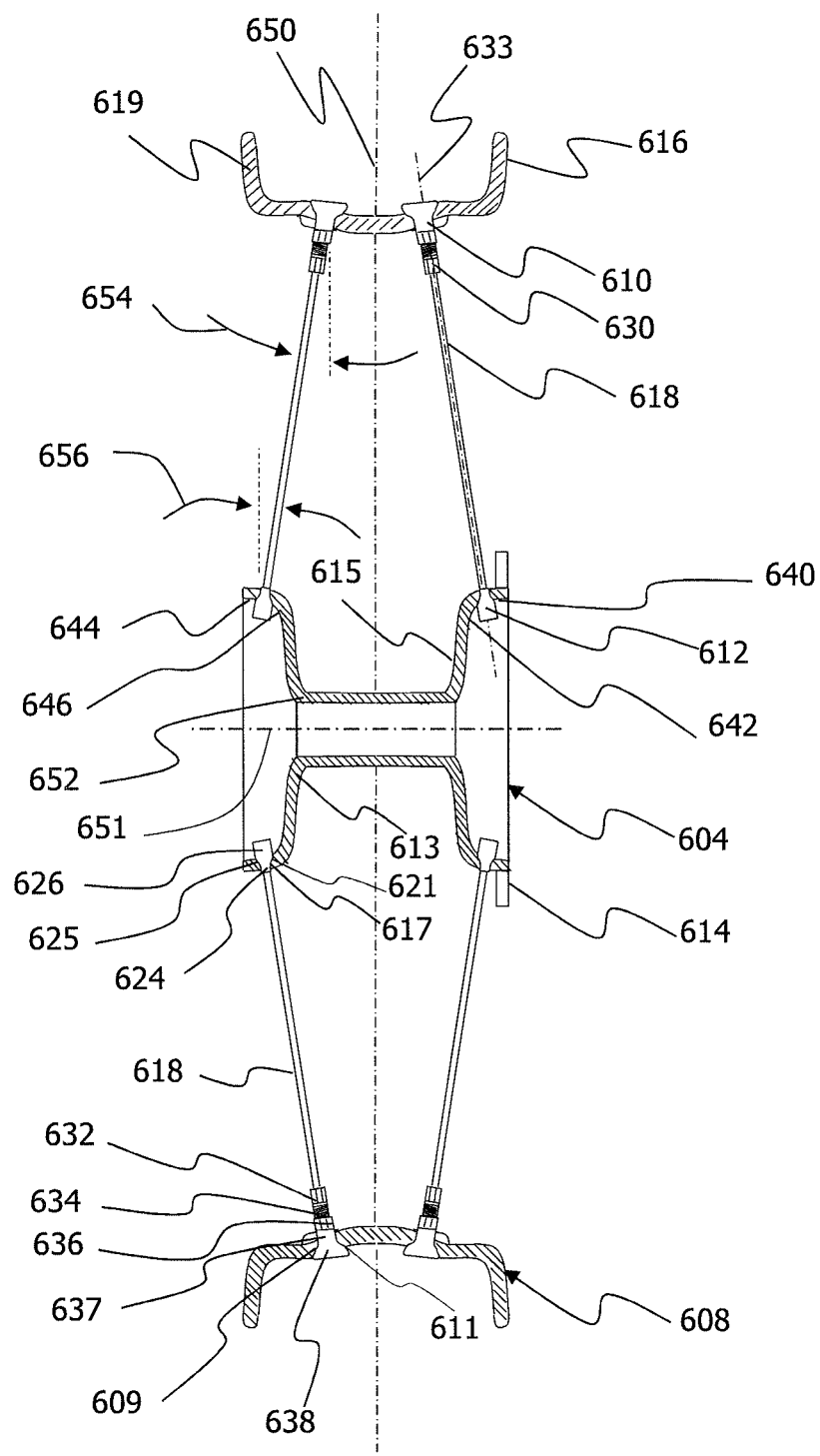
FIG. 14 is a cross-sectional view of the alternative embodiment of the wheel of the present invention, taking across line 14-14 of FIG. 11, showing the hub connected to the rim by several spokes.

Referring now to FIG. 14, a cross-sectional view of the wheel 600 taken at line 14-14 of FIG. 11 is shown. In FIG. 14, the right side of wheel 600 is on the right side of FIG. 14, and the left side of wheel 600 is on the left side of FIG. 14. A plane 650, represented by a broken line, bisects wheel 600 between the right side and left side of wheel 600. Plane 650 is perpendicular to a wheel axis 651, where the wheel axis 651 extends through an axle housing 652 of hub 604. Wheel axis 651 defines the center of the wheel 600. Plane 650 partitions rim 608 into a left-half 619 and a right-half 616, and partitions hub 604 into a left-half having a left flange 613 and a right-half having a right flange 615. As shown, the wheel 600 has a disc brake mounting surface 614 however, it is contemplated that the wheel 600 may be constructed without a disc brake mounting surface 614. It is also contemplated that the wheel 600 may be manufactured to be both a front free wheel and a rear driving wheel.

Distributed symmetrically along the perimeter of the rim 608 is a plurality of spoke holes 609. The spoke holes 609 are distributed evenly between the left-half 619 and right-half 616 of rim 608 in an alternating pattern, such as a first spoke hole located on the left-half, a second spoke hole located on the right half, a third spoke hole located on the left-half and so forth. This ensures an even number of spoke holes 609 is located on each half of the rim 608 to balance the load on the rim 608.

The hub 604 is formed with a plurality of anchor holes 617 around the perimeter of the left flange 613 and right flange 615. The anchor holes 617 are distributed evenly between the left flange 613 and right flange 615. As shown, the right flange 615 has an inner surface 642 and an outer surface 640 and the left flange 613 has an inner surface 646 and an outer surface 644. With reference to FIG. 1, the right flange 615 have anchor holes 617 formed in a staggered pattern where each subsequent anchor hole 617 alternates between the inner surface 642 and outer surface 640 of the right flange 615. The anchor holes 617 formed in left flange 613 are configured in substantially the same manner as in the right flange 615.

Each spoke hole 609 corresponds to an anchor hole 617, where a straight line projected from the center of the spoke hole 609 intersects the center of the anchor hole 617. Furthermore, the spoke holes 609 are formed in rim 608 at an angle 654 and anchor holes 617 are formed with an angle 656, where angle 654 and 656 are equal. This allows the spoke shaft 618 to extend from the anchor 612 and tube 630 in a straight line thereby avoiding any bends on spoke shaft 618. This allows the even distribution of forces along the fibers of the spoke shaft 618 and prevents any concentrated forces on the spoke shaft 618. Depending on the type of lacing used and the total number of spokes 606, the angle 654 of spoke holes 609, and angle 656 of the anchor holes 617 may vary. For example, a three-cross wheel will have different spoke angles when compared to a four-cross wheel.

Spoke hole 609 is formed to correspond with the shape and size of the nipple 610 to allow nipple 610 to seat and be retained within spoke hole 609 and includes a nipple seat to retain the spherical flange 638 of nipple 610. The spherical flange 638 of the nipple 610 is capable of angular rotation within the nipple seat. Anchor hole 617 is formed to correspond with the shape and size of the anchor 612 to allow anchor 612 to seat and retained within anchor hole 617. Anchor hole 617 includes a shoulder mating surface for rounded shoulder 625, where rounded shoulder 625 is capable of angular rotation when pressed against the shoulder mating surface.

The anchor holes 617 is formed with a wider diameter than spoke 606 and tube 630 but narrower than the body 626 of anchor 612, such that tube 630 affixed to the spoke shaft 618 can be passed through anchor hole 617, allowing the remainder of the spoke shaft 618 to pass through anchor hole 617 until anchor 612 comes into contact with the anchor hole 617 and tube 630 comes into contact with nipple 610. The tube 630 is threaded into the corresponding nipple 610 via inter-engagement of external threads 634 with threaded bore 635. The tube 630 is threaded into nipple 610 by holding the hexagonal exterior 636 of nipple 610 stationary with a wrench and rotating the spoke 606 by rotating the tube 630 by the hexagonal exterior 632 with an alternative wrench. The rounded shoulder 625 and spherical flange 638 provides a smooth, low-friction surface which allows the spoke 606 to rotate as the spoke 606 is being tensioned. The tension retains tube 630 and nipple 610 in spoke whole 609 and anchor 612 in anchor hole 617, causing spoke shaft 618 to be held taut in a substantially straight line between rim 608 and hub 604, maintaining center alignment of the hub 604 relative to the rim 608. The straightness of spoke 606 provides additional strength as all fibers 660 within spoke 606 are tensioned equally along the longitudinal axis of the spoke 606.

In wheel 600 of the alternative embodiment of the present invention, the wheel has 36 spokes (as shown in FIG. 11). A total of 18 spokes are attached between the right flange 615 and right-half 616 of rim 608, and 18 spokes are attached between left flange 613 and left-half 619 of rim 608. Wheel 600 may alternatively have more or fewer than 36 spokes 606. For example, wheel 600 may have 32 spokes. While it is possible to have different numbers of spokes attached to the hub 604, having the same number of spokes attached to each of the flanges 613 and 615 balances the load on the hub 604.

While the wheel with high strength flexible spokes of the present invention as herein shown and disclosed in detail is fully capable of obtaining the objects and providing the advantages herein before stated, it is to be understood that it is merely illustrative of preferred and alternative embodiments of the invention and that no limitations are intended to the details of construction or design herein shown other than as described in the appended claims.

I claim:

1. A method of manufacturing a lightweight wheel, comprising:
    providing a rim having a plurality of spoke holes formed at a spoke hole angle, wherein said plurality of spokes holes are evenly distributed between a left side and a right side of said rim;
    providing a hub comprising a left flange having an inner surface and an outer surface on a left side of said hub, a right flange having an inner surface and an outer surface on a right side of said hub, and a plurality of anchor holes evenly distributed between said left flange and said right flange;
    providing a plurality of high strength flexible spokes having a central axis, each of said high strength flexible spokes comprising a flexible spoke shaft having non-rigid fibers encased in a non-rigid jacket having a first end wedge and a second end wedge, an anchor having a tapered bore receiving said first end wedge, and a tube having a tapered bore receiving said second end wedge, wherein said first end wedge and said second end wedge consist of said non-rigid fibers and an epoxy;
    providing a nipple housed within said spoke hole of said rim; and
    attaching each of said plurality of high strength flexible spokes between said hub and said rim in a straight line, wherein said anchor is affixed to said anchor hole and said tube is affixed to said nipple, thereby mechanically fastening said hub to said rim.

2. The method of manufacturing a lightweight wheel of claim 1, wherein said tube further comprises external threads.

3. The method of manufacturing a lightweight wheel of claim 2, wherein said nipple comprises a threaded bore sized to threadably receive said external threads of said tube.

4. The method of manufacturing a lightweight wheel of claim 3, wherein said tube is affixed to said nipple by threading said external threads of said tube into said threaded bore of said nipple.

5. The method of manufacturing a lightweight wheel of claim 4, wherein said anchor is configured to rotate in said anchor hole and said nipple is configured to rotate in said spoke hole.

6. A method of manufacturing a lightweight wheel, comprising:
    providing a rim having a plurality of spoke holes formed at a spoke hole angle, wherein said plurality of spokes holes are evenly distributed between a left side and a right side of said rim;
    providing a hub comprising a left flange having an inner surface and an outer surface on a left side of said hub, a right flange having an inner surface and an outer surface on a right side of said hub, and a plurality of anchor holes evenly distributed between said left flange and said right flange;
    providing a plurality of high strength flexible spokes having a central axis, each of said high strength flexible spokes comprising a flexible spoke shaft having non-rigid fibers encased in a non-rigid jacket having a first end wedge and a second end wedge, an anchor having a tapered bore receiving said first end wedge, and a tube having a tapered bore receiving said second end wedge, wherein said first end wedge and said second end wedge consist of said non-rigid fibers and an epoxy;
    providing a plurality of nipples;
    placing each of said plurality of nipples in each of said plurality of spoke holes; and
    attaching each of said plurality of high strength flexible spokes between said hub and said rim, wherein said anchor is affixed to said anchor hole and said tube is affixed to said nipple, thereby mechanically fastening said hub to said rim.

7. The method of manufacturing a lightweight wheel of claim 6, wherein said tube further comprises external threads.

8. The method of manufacturing a lightweight wheel of claim 7, wherein said nipple comprises a threaded bore sized to threadably receive said external threads of said tube.

9. The method of manufacturing a lightweight wheel of claim 8, wherein said tube is affixed to said nipple by threading said external threads of said tube into said threaded bore of said nipple.

10. The method of manufacturing a lightweight wheel of claim 9, wherein said anchor is configured to rotate in said anchor hole and said nipple is configured to rotate in said spoke hole.

* * * * *